US008577548B2

(12) United States Patent
Miller et al.

(10) Patent No.: US 8,577,548 B2
(45) Date of Patent: Nov. 5, 2013

(54) SYSTEM AND METHOD FOR CONTROLLING AN ENTERTAINMENT DEVICE IN A VEHICLE BASED ON DRIVER STATUS AND A PREDETERMINED VEHICLE EVENT

(75) Inventors: Thomas Lee Miller, Ann Arbor, MI (US); Brian Bennie, Sterling Heights, MI (US); Scott Alan Watkins, Sterling Heights, MI (US); Matthew J. Dalebout, Canton, MI (US); Andrew D. Sarkisian, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 12/992,397

(22) PCT Filed: Jun. 23, 2009

(86) PCT No.: PCT/US2009/048261
§ 371 (c)(1),
(2), (4) Date: Nov. 12, 2010

(87) PCT Pub. No.: WO2009/158338
PCT Pub. Date: Dec. 30, 2009

(65) Prior Publication Data
US 2011/0093165 A1    Apr. 21, 2011

Related U.S. Application Data

(60) Provisional application No. 61/076,329, filed on Jun. 27, 2008, provisional application No. 61/103,183, filed on Oct. 6, 2008.

(51) Int. Cl.
*B60R 25/00* (2013.01)

(52) U.S. Cl.
USPC ...................................... 701/36; 340/426.11

(58) Field of Classification Search
USPC .......... 701/1, 36, 49, 45; 340/426.11, 426.12, 340/426.14, 4.3, 4.34, 5.2, 5.21, 5.3, 5.31, 340/457.1; 303/121
See application file for complete search history.

(56) References Cited

U.S. PATENT DOCUMENTS

| 4,849,733 A | 7/1989 | Conigliaro et al. |
| 5,027,432 A | 6/1991 | Skala et al. |

(Continued)

FOREIGN PATENT DOCUMENTS

| DE | 19961619 A1 | 6/2001 |
| EP | 1071297 A2 | 1/2001 |

(Continued)

OTHER PUBLICATIONS

European Search Report for Application No. 09770872.1, mailed Jun. 7, 2011, 6 pages.

(Continued)

*Primary Examiner* — Dalena Tran
(74) *Attorney, Agent, or Firm* — Brooks Kushman P.C.; Jennifer M. Stec

(57) ABSTRACT

In at least one embodiment, an apparatus and a method for transmitting at least one of an audio signal and a video signal based on driver status and an occurrence of a predetermined vehicle event is provided. The apparatus comprises an entertainment device. The entertainment device is configured to receive a key identification signal from a key indicative of the driver being one of a primary driver and a secondary driver and to receive a vehicle status signal to detect the occurrence of the predetermined vehicle event. The entertainment device is further configured to disable the transmission of the at least one of the audio signal and the video signal in response to the key identification signal indicating that the driver is the secondary driver and to detecting the occurrence of the predetermined vehicle event.

16 Claims, 7 Drawing Sheets

(56) References Cited

U.S. PATENT DOCUMENTS

| | | | |
|---|---|---|---|
| 5,132,880 | A | 7/1992 | Kawamura |
| 5,181,773 | A | 1/1993 | Colvin |
| 5,303,163 | A | 4/1994 | Ebaugh et al. |
| 5,471,389 | A | 11/1995 | Hahlganss |
| 5,769,051 | A | 6/1998 | Bayron et al. |
| 5,803,043 | A | 9/1998 | Bayron et al. |
| 5,829,782 | A * | 11/1998 | Breed et al. ............ 280/735 |
| 5,892,436 | A | 4/1999 | Blackburn et al. |
| 6,215,395 | B1 | 4/2001 | Slaughter et al. |
| 6,266,589 | B1 | 7/2001 | Boies et al. |
| 6,362,734 | B1 | 3/2002 | McQuade et al. |
| 6,430,488 | B1 | 8/2002 | Goldman et al. |
| 6,556,905 | B1 | 4/2003 | Mittelsteadt et al. |
| 6,558,027 | B2 | 5/2003 | Ellis et al. |
| 6,690,956 | B2 | 2/2004 | Chua et al. |
| 6,772,061 | B1 | 8/2004 | Berthiaume et al. |
| 6,952,156 | B2 | 10/2005 | Arshad et al. |
| 6,998,956 | B2 | 2/2006 | Dix |
| 7,075,409 | B2 | 7/2006 | Guba |
| 7,131,756 | B2 | 11/2006 | Leslie et al. |
| 7,199,703 | B2 | 4/2007 | Okita et al. |
| 7,363,139 | B2 * | 4/2008 | Glora et al. .................. 701/93 |
| 7,394,353 | B2 * | 7/2008 | Schambeck et al. ..... 340/426.36 |
| 7,616,129 | B2 * | 11/2009 | Thacher ..................... 340/905 |
| 7,711,355 | B1 * | 5/2010 | Kruger et al. ................ 455/417 |
| 7,757,803 | B2 | 7/2010 | Fiske et al. |
| 7,959,177 | B2 | 6/2011 | Fiske et al. |
| 8,050,815 | B2 * | 11/2011 | Perry et al. .................. 701/31.5 |
| 2002/0173881 | A1 | 11/2002 | Lash et al. |
| 2004/0198306 | A1 | 10/2004 | Singh et al. |
| 2004/0205334 | A1 | 10/2004 | Rennels |
| 2004/0209594 | A1 | 10/2004 | Naboulsi |
| 2004/0263316 | A1 | 12/2004 | Dix et al. |
| 2005/0128121 | A1 | 6/2005 | Kroculick |
| 2006/0114101 | A1 | 6/2006 | Schambeck et al. |
| 2006/0148490 | A1 | 7/2006 | Bates et al. |
| 2007/0001828 | A1 | 1/2007 | Martinez |
| 2007/0126604 | A1 | 6/2007 | Thacher |
| 2008/0064446 | A1 | 3/2008 | Camp et al. |
| 2009/0195376 | A1 | 8/2009 | Miller et al. |
| 2009/0312901 | A1 | 12/2009 | Miller et al. |
| 2010/0087987 | A1 | 4/2010 | Huang et al. |
| 2012/0065862 | A1 | 3/2012 | Fiske et al. |

FOREIGN PATENT DOCUMENTS

| | | |
|---|---|---|
| GB | 2273580 A | 6/1994 |
| WO | 9204696 A1 | 3/1992 |
| WO | 2004019646 A1 | 3/2004 |
| WO | 2008062403 A1 | 5/2008 |

OTHER PUBLICATIONS

Patty Mattern, "Getting smarter at getting safer", University of Minnesota, UMNnews, Sep. 13, 2005, 2 pages.

European Examination Report for Application No. 09 770 872.1, mailed Feb. 23, 2012, 6 pages.

English translation of DE 199 61 619 A1, Jun. 28, 2001, 5 pages.

"Driving—Forward (If Equipped) and Reverse Sensing Systems," pp. 244-245, Jun. 2002.

International Search Report and Written Opinion for corresponding Application No. PCT/US2009/048261, mailed Aug. 7, 2009, 9 pages.

* cited by examiner

SYSTEM AND METHOD FOR CONTROLLING AN ENTERTAINMENT DEVICE IN A VEHICLE BASED ON DRIVER STATUS AND A PREDETERMINED VEHICLE EVENT

CROSS-REFERENCE TO RELATED APPLICATIONS

This application is the U.S. national phase of PCT application Ser. No. PCT/US2009/048261 filed Jun. 23, 2009 which claims the benefit of U.S. provisional application Ser. No. 61/076,329 filed on Jun. 27, 2008 and U.S. provisional application Ser. No. 61/103,183 filed on Oct. 6, 2008 all of which are hereby incorporated by reference in their entirety.

BACKGROUND

1. Technical Field

The embodiments of the present invention generally relate to a system and method for controlling an entertainment device in a vehicle based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may share the keys of the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other such primary drivers, the option of preventing teenagers that are eligible to drive or other such secondary drivers from disabling safety and notification features.

SUMMARY

In at least one embodiment, an apparatus and a method for transmitting at least one of an audio signal and a video signal based on driver status and an occurrence of a predetermined vehicle event is provided. The apparatus comprises an entertainment device. The entertainment device is configured to receive a key identification signal from a key indicative of the driver being one of a primary driver and a secondary driver and to receive a vehicle status signal to detect the occurrence of the predetermined vehicle event. The entertainment device is further configured to disable the transmission of the at least one of the audio signal and the video signal in response to the key identification signal indicating that the driver is the secondary driver and to detecting the occurrence of the predetermined vehicle event.

DETAILED DESCRIPTION

Figure 1:
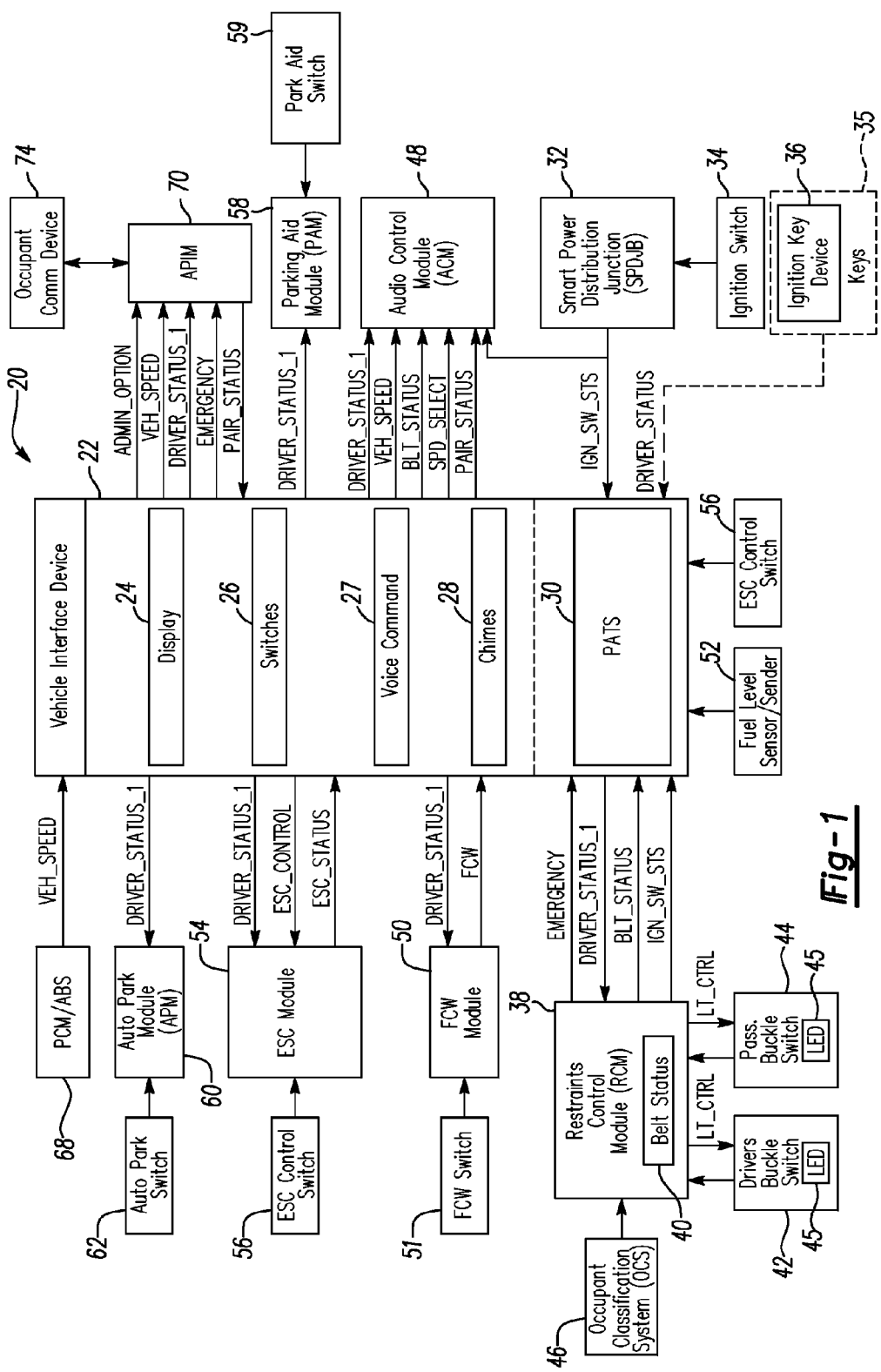
FIG. 1 depicts a system for differentiating between primary and secondary drivers of a vehicle and for controlling the operation of various vehicle features based on the status of the driver in accordance to one embodiment of the present invention.

The embodiments of the present invention generally provide for a driver identification functional operation whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various safety and/or notification features in the vehicle. For example, the primary driver may enable or disable the safety and/or notification features in the vehicle. The secondary driver may be defined as a restricted driver who has limited control over the safety and/or notification features generally provided by the vehicle and is to abide by the functional restrictions imposed or selected by the vehicle or the primary driver. For example, the primary driver may enable the safety and/or notification features for the secondary driver, and the secondary driver is not capable of disabling such features when enabled by the primary driver.

The embodiments of the present invention generally provide, among other things, for a system and method for controlling an entertainment device to notify the secondary driver that a driver operation has not been met. For example, the primary driver may control the entertainment device to disable the operation thereof in the event the secondary driver fails to perform a predetermined vehicle operation. One or more controllers in the vehicle may detect vehicle events which indicate that the secondary driver has failed to perform a predetermined vehicle operation. The entertainment device may be disabled in the event the secondary driver (or other vehicle occupants in the vehicle along with the secondary driver) fails to buckle his/her seatbelt, fails to keep vehicle speed from exceeding at least one preselected speed, fails to pair a communication device to a vehicle on-board system that enables voice input control and in-vehicle switching control to operate the communication device, and/or fails to maintain an appropriate distance behind a vehicle (i.e., tailgating with another vehicle). The entertainment device may be disabled by, but not limited to, limiting the volume generated therefrom, muting audio signals, and/or preventing the transmission of video signals from the entertainment device in response to detecting that the secondary driver has not performed the predetermined vehicle operation.

Conventional systems generally provide audible chimes or illuminate visual indicators as a means to obtain a driver's attention to a vehicle event that is occurring or as a means to encourage the driver to perform a predetermined operation. While such alert mechanisms may be useful, after time, drivers become accustomed to such alerts to the extent in which they may not have the desired affect as intended. For example, the secondary driver may simply ignore the chimes and/or visual indicators which defeat the purpose of encouraging the secondary driver to perform a predetermined function. It may be difficult for the secondary driver to ignore the fact that the entertainment device may be muted or is disabled from transmitting video signals for entertainment purposes. Such a disabling of the entertainment device may encourage the secondary driver to perform a predetermined function that is deemed essential by the primary driver to encourage the secondary driver to become a safer driver.

The embodiments of the present invention as set forth in FIGS. 1-7 generally illustrate and describe a plurality of controllers (or modules), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. It is generally recognized that each controller and/or module disclosed herein may include, but not limited to, any number of microprocessors, ASICs, ICs, memory devices (e.g., FLASH, RAM, ROM, EPROM and/or EEPROM), and software which co-act with one another to perform the various functions set forth below.

FIG. 1 depicts a system 20 for differentiating between the primary and secondary drivers of the vehicle and for controlling the operation of various vehicle features based on the status of the driver. The system 20 generally comprises a vehicle interface device 22. The device 22 includes a display 24. The display 24 provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message.

The device 22 also includes a plurality of switches 26, a voice recognition command interface 27 and chimes 28. The driver may toggle the switches 26 to view different messages and/or respond to various prompts directed to the driver by the vehicle. The voice recognition command interface 27 may enable the vehicle to receive commands from the driver so that the driver may audibly input commands and/or responses. The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. While the display 24, the switches 26, and the voice input command interface 27, and chimes 28 are shown within the device 22, it is contemplated that such mechanisms may be positioned exterior to the device 22.

The device 22 includes a passive anti-theft security (PATS) controller 30. While FIG. 1 generally illustrates that the PATS controller 30 is positioned within the device 22, other implementations may include the PATS controller 30 being implemented as a standalone controller (e.g., the PATS controller 30 is positioned external to the device 22). A smart power distribution junction box (SPDJB) controller 32 may be operably coupled to the device 22. The device 22 and the SPDJB controller 32 may communicate with each other via a data communication bus. In general, one or more of the signals transmitted to/from the device 22 may be transmitted via the bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation. The SPDJB controller 32 may include a plurality of fuses, relays, and various micro-controllers for performing any number of functions related to the operation of interior and/or exterior electrically based functionality of the vehicle. Such functions may include, but are not limited to, electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 34 may be operably coupled to the SPDJB controller 32. The SPDJB controller 32 may receive hardwired signals indicative of the position of the ignition switch 34 and transmit messages on the bus that indicate the position of the ignition switch. For example, the SPDJB controller 32 may transmit a signal IGN_SW_STS over the bus to the device 22. The SPDJB controller 32 may transmit the signal IGN_SW_STS to any controller coupled to the bus that may need key ignition status as an input to perform a particular function.

The ignition switch 34 may receive one or more keys 35. The keys 35 may be tagged or associated with the primary driver or the secondary driver of the vehicle. The key 35 includes an ignition key device 36 embedded therein for communicating with the vehicle. The ignition key device 36 comprises a transponder (not shown) having an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (or engine controller) 68 operably coupled to the PATS controller 30 allows the vehicle to start the engine. In general, the vehicle assembly plant, supplier facility (e.g., manufacturer of the keys and/or PATS controller 30), or car dealership performs the operation of learning the data transmitted by the keys 35 to the vehicle prior to delivery the vehicle to the end user. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the particular driver is the primary driver or the secondary driver to various vehicle controllers or modules as either digital data or hardwired signals. Prior to the PATS controller 30 transmitting the signal DRIVER_STATUS_1, the primary and secondary keys must be learned to the PATS controller 30.

The system 20 may employ a number of different operations for associating the keys 35 to the primary and secondary drivers. In one implementation, the PATS controller 30 may employ a sequential based operation for associating the keys 35 to the primary driver and the secondary driver. For example, during the learn operation whereby the data on the signal DRIVER_STATUS for a particular key is learned to the vehicle to support the passive anti-theft function, the PATS controller 30 may assign priority status to the first key learned which in essence tags the first key as the primary key. The data of the first key learned to the vehicle may be assigned a higher status than the second key. The data of the second key when learned to the vehicle may be designated by the PATS controller 30 as the secondary key. The particular order with respect to when a key is assigned primary or secondary status may be varied to meet the designed criteria of a particular implementation. In addition, any number of spare keys may be tagged as being either primary or secondary. For example, any number of replacement or spare keys may be learned to the vehicle and designated as either a primary key or a secondary key. After the PATS controller 30 tags the keys 35 as either a primary key or a secondary key, the PATS controller 30 sends the signal DRIVER_STATUS_1 over the bus to indicate whether the driver of the vehicle is the primary driver or the secondary driver. The tag operation may be performed simultaneously with the process of learning the keys 35 to the PATS controller 30 for passive anti-theft purposes.

In another implementation, the signal DRIVER_STATUS transmitted by the keys 35 may include a portion of the RF based data that is used to identify the driver whereas the remaining portion of RF based data is used for anti-theft purposes. For example, the portion of the RF based data used to identify the data may correspond to a byte of predetermined hex values (or other suitable binary based format) that corresponds to whether the driver of the vehicle is the primary or secondary driver. In one implementation, the byte may include the value "FE" which corresponds to the primary driver. The PATS controller 30 upon receiving the signal DRIVER_STATUS with information corresponding to the "FE" value may recognize the particular key as a primary key and with the remaining portion of the RF based data may authorize the engine to start. The byte may also include the value "FF" in the place of "FE" which corresponds to the secondary driver. The PATS controller 30 upon receiving the signal DRIVER_STATUS with information corresponding to the value "FF" may recognize the particular key as a primary key and authorize the engine to start with the remaining portion of the RF based data. It should be noted that the hex bytes "FE" and "FF" are used for illustrative purposes. The particular type of binary based format and the length of data used to correspond to the primary and secondary drivers may vary based on the desired criteria of a particular implementation.

In yet another implementation, the primary driver may program one or more keys as a secondary key and/or change status of the secondary key back to a primary key as disclosed in co-pending U.S. patent Ser. No. 12/139,005, entitled "SYSTEM AND METHOD FOR PROGRAMMING KEYS TO ESTABLISH PRIMARY AND SECONDARY DRIVERS" and filed on Jun. 13, 2008, which is hereby incorporated by reference in its entirety.

A restraint control module (RCM) 38 may be operably coupled to the device 22 via the bus. The RCM 38 may deploy various safety restraint systems in response to the vehicle experiencing impact with an object. For example, the restraint control module 38 may deploy one or more airbags positioned about the vehicle, motorized pretensioners, and/or seat controls to reduce the risk of injury to vehicle occupants in the event the vehicle experiences an impact. The RCM 38 may transmit a signal EMERGENCY in response to an airbag being deployed in the vehicle. In another example, the RCM 38 may transmit the signal EMERGENCY in response to a signal transmitted by a fuel cutoff switch (or inertia switch) (not shown) which may indicate the presence of a collision. Such conditions are generally illustrative of the vehicle being in an emergency state.

A seatbelt status controller 40 may be operably coupled to the restraints control module 38. While FIG. 1 generally illustrates that the seatbelt status controller 40 is positioned within the RCM 38, additional configurations may include positioning the seatbelt status controller 40 exterior to the RCM 38. The seatbelt status controller 40 is generally adapted to notify the driver that one or more seatbelts in the vehicle have not been fastened or are in an unbuckled state. Various examples of describing the operation of the seatbelt status controller are disclosed in U.S. Pat. No. 6,278,358 to Spoto et al.; U.S. Pat. No. 6,362,734 to McQuade et al.; and U.S. Pat. No. 6,501,374 to King et al.

A driver's buckle switch 42 is coupled to the seatbelt status controller 40 and generally presents data indicative of whether the driver's seatbelt is fastened to the driver. At least one passenger buckle switch 44 is also coupled to the seatbelt status controller 40 and generally presents data indicative of whether various seatbelts for one or more passengers positioned throughout the vehicle are (e.g., front or rear) fastened. Each switch 42, 44 may include a light emitting diode (LED) 45 or other suitable light source to illuminate to help the driver and passengers locate the seatbelt buckle switch 42, 44. Such LEDs may remind the driver and/or the passengers to buckle the seatbelt. In operation, upon opening one or more of the doors of the vehicle, the LED 45 may stay illuminated until the belt is buckled.

An occupant classification system 46 may be optionally coupled to the seatbelt status controller 40 for providing information with respect to the position of the occupants in the vehicle. The seatbelt status controller 40 may use such information provided by the occupant classification system 46 to determine which seat is occupied by an occupant. Based on vehicle occupant location, the seatbelt status controller 40 may have knowledge with respect to which seatbelts may need to be monitored by the seatbelt status controller 40.

In general, the seatbelt status controller 40 is configured to audibly notify the occupant and the device 20 is configured to visually notify the occupant in the vehicle that one or more of the seatbelts are not fastened when the ignition is in the run position and/or the vehicle speed is above a predetermined speed threshold. Such a feature may be defined as a seatbelt notification feature. In addition, the seatbelt status controller 40 may be deactivated if at any time the seatbelt is fastened (or buckled), or after the vehicle interface device 20 and/or the seatbelt status controller 40 has audibly notified the occupant for a predetermined amount of time (e.g., five minutes). The seatbelt status controller 40 includes a chime (not shown) for audibly notifying the driver in the event one or more of the seatbelts are not fastened, the vehicle speed has reached and/or exceeded the predetermined vehicle speed threshold, and the position of the ignition switch 34 is in run. The seatbelt status controller 40 may transmit a signal BLT_STS over the bus to the device 22 so that the device 22 visually notifies the driver via the display 24 or with a telltale indicator that one or more of the seatbelts are not fastened (or buckled). The telltale is generally defined as a indicator positioned in the device 22 which includes a symbol (e.g., engine, seatbelt, low fuel, etc.) positioned thereon and configured to illuminate when predetermined conditions related to each of the engine, seatbelt and low fuel have been met. It is also contemplated that the display 24 may visually notify the driver of the buckle status of one or more passengers in the vehicle. For example, the device 22 may present a text message or automated audible message such as "two rear passengers are buckled", "a rear passenger has become un-buckled", or "a $3^{rd}$ row center has become un-buckled". In addition to such text or automated audible messages being transmitted, the seatbelt status controller 40 or the device may provide a chime in the event one or more of the passengers become unbuckled.

The signal BLT_STS generally corresponds to a restraint status signal in which one or more of the seatbelts may be unfastened or in an unbuckled state and the vehicle speed and the ignition status conditions have been met. In one example, the seatbelt status controller 40 may transmit an intermittent chime at 240 rep/min at a frequency of 740 Hz. The number or repetitions per minute and the frequency of the chime may vary based on the desired characteristics of a particular implementation. In the event the seatbelt status controller 40 is deactivated as noted above, the seatbelt status controller 40 may cease to transmit the signal BLT_STS to the device 22 so that the device 20 does not provide the visual notification to the occupant.

The device 22 transmits the signal IGN_SW_STS to the seatbelt status controller 40 so that the seatbelt status controller 40 may assess the status of the ignition switch 34 (e.g., OFF, RUN, ACCY or START). An audio control module (ACM) (or entertainment device) 48 may be operably coupled to the device 22 via the bus. In one example, the ACM 48 may be a radio having a compact disc player or other audio playback capability. In another example, the ACM 48 may be a video playback device such as a DVD player, BLUE RAY® disc play, or other suitable device. The ACM 48 may generate audible signals for entertainment purposes or enable voice recognition operations. The ACM 48 may also be adapted to amplify voice commands in the event a cell phone is coupled to the ACM 48. In addition, the ACM 48 may be used in combination with a voice recognition session. The ACM 48 may cease to generate audible signals (or is placed in a "muted" state) in response to the seatbelt status controller 40 determining that one or more seatbelts are not fastened and/or the vehicle speed and ignition status conditions are met. The ACM 48 performs the mute operation in response to receiving the signal BLT_STATUS. The ACM 48 may also stop transmitting video signals in response to the seatbelt status controller 40 determining that one or more seatbelts are not fastened and/or the vehicle speed and ignition status conditions are met. The ACM 48 may not be in a muted state when used to facilitate a cell phone conversation or when used in connection with a voice recognition session in the event the seatbelts are disabled and the applicable vehicle criteria is met.

Conventional vehicles generally provide drivers with the ability to enable or disable the seatbelt status controller 40 in order to turn off/on the controller 40 as desired by the driver. By disabling the controller 40, the controller 40 may cease to audibly notify the driver and cease to transmit the signal BLT_STATUS to the device 22. The system 20 is configured to enable/disable the seatbelt status notification feature of the controller 40 based on driver status. For example, the primary driver can selectively enable or disable the seatbelt status notification feature of the controller 40 (e.g., primary driver can turn on/off the seatbelt status notification feature provided by the controller 40). However, the system 20 prevents the secondary driver from disabling the operation of the seatbelt status controller 40 (i.e., prevents the secondary driver from turning off the seatbelt status notification feature). The controller 40 receives the signal DRIVER_STATUS_1 to determine whether the driver is the primary driver or the secondary driver. The seatbelt status controller 40 is generally configured "ON" and provides audible notification and the device 22 is configured to visually present the safety belt unfastened message when the applicable vehicle criteria is met and in response to determining that the secondary driver is driving the vehicle. The functionality performed by the seatbelt status controller 40 may be incorporated into the device 22 or the SPDJB 32.

In one example, the device 22 may visually or audibly present the option of enabling/disabling the seatbelt status notification feature option via the display 24 and allow the primary driver to select a corresponding option via the switches 26 or the voice command option 27. For example, the device 22 may transmit a control signal (not shown) to the seatbelt status controller 40 to enable/disable the seatbelt status operation. The device 22 on the other hand may not visually present the option of enabling/disabling the seatbelt status notification feature to the secondary driver in response to detecting that the driver of the vehicle is the secondary driver. In the event the driver of the vehicle is the secondary driver, the ACM 48 is muted in response to determining that the secondary driver (or other occupant(s) in the vehicle along with the secondary driver) is not fastened with a seatbelt. The muted characteristic of the ACM 48 may not be overridden by the secondary driver. The muted characteristic of the ACM 48 is removed when the secondary driver and/or passengers with the secondary driver fastens their corresponding seatbelt. In another example, the ACM 48 if implemented as a video playback device may mute sound muted and/or disable the function of displaying video. The ACM 48 resumes normal operation when the secondary driver and/or passenger with the secondary driver fastens their corresponding seatbelt.

In addition, the system 20 may allow the primary driver to enable/disable seatbelt buckle lighting function provided by the LEDs 45 on the switches 42, 44 as desired. For example, the device 22 may visually or audibly present the option of enabling/disabling the seatbelt buckle lighting feature via the device 22 and may allow the driver to make the selection via the switches 26 or the voice command interface 27. In such an example, the device 22 may transmit a control signal (not shown) to the seatbelt status controller 40 to enable/disable the seatbelt buckle lighting feature. The seatbelt status controller 40 may transmit a hardware signal (e.g., LT_CTRL) to turn the LEDs 45 on/off. The device 22 on the other hand may not present such an option to the secondary driver in response to detecting that the driver of the vehicle is the secondary driver.

Likewise, the device 22 may allow the primary driver to enable/disable the passenger seatbelt monitor operation in which the device 22 is capable of notifying the driver of the buckle status of one or more passengers in the vehicle. For example, the device 22 may visually or audibly present the option of enabling/disabling the passenger seatbelt monitor operation via the display 24 and allow the primary driver to make the selection via the switches 26 or voice command 27 as desired. The device 22 on the other hand may not visually present the option to the secondary driver in response to detecting that the driver of the vehicle is the secondary driver. The secondary driver is expected to know when one or more of the passengers un-buckle his/her corresponding seatbelt. The ACM 48 may be placed in a muted state in the event one or more of the passengers un-buckle the seatbelt and/or if the vehicle is traveling above a predetermined vehicle speed. Such a mute characteristic as noted in connection with the passenger seatbelt monitor may be enabled/disabled by the primary driver as desired. However, the mute characteristic remains "ON" in the event the driver is the secondary driver.

A forward collision warning (FCW) module 50 may be operably coupled to the device 22 and receive the signal DRIVER_STATUS_1 from the device 22. The FCW module 50 may be a portion of an active sensing system that is adapted to determine if the vehicle is in a state in which a frontal collision may be imminent. In such a case, the FCW module 50 may transmit a signal FCW to the device 22 in the event a forward collision is imminent. The FCW system generally includes a heads up display (HUD) which includes a bank of LEDs. The bank of LEDs are disposed about the windshield of the vehicle. The FCW module 50 is operably coupled to a radar system (not shown). The radar system detects the position of the object with respect to the vehicle. In the event an imminent collision is detected by the radar system, the radar system transmits a control signal (not shown) to the FCW module 50. The FCW module 50 illuminates the bank of LEDs to notify the occupants that a collision may be imminent. The FCW module 50 generally allows the driver to enable/disable the chime and/or the visual indicators as well as to adjust a particular sensitivity level.

The device 22 may also audibly and visually notify (via the display 24 (or telltale) and the chimes 28) the driver of the collision when the collision is imminent. An FCW switch 51 may be coupled to the FCW module 50 to enable/disable the FCW module 50 and control vehicle sensitivity. In addition the FCW feature may be enabled/disabled by the primary driver via the switches 26 in the device 22. In such an example, the device 22 may transmit a control signal (not shown) to the FCW module 50 to enable/disable the FCW feature. The primary driver is generally permitted to enable/disable the chime and/or visual indicator and adjust the sensitivity level of the FCW system. The secondary driver is prohibited from disabling the FCW feature in the event the secondary driver is detected to be the driver of the vehicle. For example, the device 22 may not present the enable/disable prompt to the secondary driver via the device 22 to allow the secondary driver to disable FCW. The device 22 is configured to allow the secondary driver to adjust vehicle sensitivity for determining the particular moment in which the FCW warning is to be issued. The secondary driver may increase/decrease sensitivity to trigger the FCW earlier/later based on the selected sensitivity level. The secondary driver is prohibited from enabling/disabling the visual and/or audible warning mechanism of the FCW.

A fuel level sensor 52 may be operably coupled to the device 22 for transmitting information with respect to the amount of fuel (or the fuel level) in the fuel tank of the vehicle. The device 22 may visually present a low fuel warning via the display 24 or with a telltale (not shown). The device 22 is adapted to calculate the amount of fuel based on the fuel level information provided by the fuel level sensor 52. In one example, the device 22 is generally adapted to present the low fuel warning when the fuel level is less than or equal to a standard Distance-To-Empty (DTE). The DTE is defined as the distance in miles or kilometers from the moment to when the fuel tank may be empty. The DTE value may be varied based on who the particular driver (e.g., primary or secondary) of the vehicle is. In one example, the standard DTE for the primary driver may be in a range of between one to sixty miles from the moment in which the fuel tank may be empty.

The strategy for triggering the low fuel warning may be altered in the event the device 22 determines that the vehicle is being driven by the secondary driver. For example, the low fuel warning may be issued when the fuel level is greater than or equal to the standard DTE multiplied by a predetermined value. In one example, the predetermined value may be set to one and a half while the DTE is at fifty miles. In such a case, the device 22 may issue the low fuel warning earlier (e.g., at seventy five miles before the fuel tank is empty) when compared to the point in which the low fuel warning is issued for the primary driver. In general, the system 20 is adapted to provide for the low fuel warning at an earlier point in time when the driver of the vehicle is detected to be the secondary driver. It should be noted that the low fuel level strategy may be implemented for any type of low fluid warning detection configuration in the vehicle. Such a low fluid warning detection configuration may apply to windshield wiper fluid, oil and/or transmission fluid.

An ESC module 54 may be operably coupled to the device 22. The ESC module 54 is adapted to control the operation of various electronic stability control (ESC) systems, such as traction control (TC), yaw stability control (YSC) and roll-over stability control (RSC). The ESC module 54 may include a TC controller (not shown), a YSC controller (not shown) and a RSC controller (not shown). The TC controller generally reduces power to drive wheels of the vehicle in order to minimize wheel-spin and maximize traction. The YSC controller generally controls the vehicle's motion of rotation about a vertical axis. The RSC controller generally controls the motion of the vehicle by selectively applying brakes and controlling the speed of the vehicle to prevent the vehicle from rolling over.

An ESC control switch 56 may be operably coupled directly to the ESC module 54 or directly to the device 22. The ESC control switch 56 generally allows the driver the ability to enable/disable the one or more ESC operations in the event one or more of the ESC operations are not needed. For example, the ESC control switch 56 may allow the driver the ability to disable the traction control system due to various road conditions, such as snow, dirt, ice, etc. The ESC module 54 is configured to present a signal ESC_STATUS to the device 22 so that the device 22 can display the current state of ESC systems (e.g., TC, YSC and RSC). In the event the ESC control switch 56 is coupled to the device 22, the device 22 transmits a signal ESC_CONTROL to the ESC module 54 to enable/disable the ESC operations. The switch 26 may also be used by the driver to enable/disable the ESC operation without the need for the ESC switch 56. In such a case, the device 22 transmits the signal ESC_CONTROL to the ESC module 54 to enable/disable the ESC operation.

The ESC module 54 is adapted to receive the signal DRIVER_STATUS from the device 22 to determine if the driver of the vehicle is the primary or the secondary driver. The ESC module 54 is configured to prevent the secondary driver from disabling any one or more of the ESC operations. For example, the primary driver may desire to prevent the secondary driver from disabling the traction control operation for safety reasons. Such a condition may prevent the secondary driver from spinning or burning the tires and/or drifting when the traction control is disabled. In the event the driver of the vehicle is the secondary driver, the device 22 may not present a message in the display 24 to the secondary driver to allow the secondary driver to disable the ESC operations. In the event the secondary driver attempts to disable any one or more of the ESC features, the device 22 may display an ESC driver status message.

The primary driver may allow the secondary driver to enable/disable the operation of the traction control in the event it may be likely that the secondary driver may experience road conditions that may require disabling traction control. For example, due to various weather conditions or road conditions, the primary driver may configure the ESC module 54 via the device 22 to allow the secondary driver to disable the traction control. For example, the display 24 may provide for an inhibit traction control message which allows the primary driver the option of either allowing the secondary driver the ability to enable/disable traction control or to inhibit enabling/disabling the traction control.

In the event the primary driver intends to allow the secondary driver to enable/disable the traction control, the primary driver may simply choose not to select the inhibit traction control option with the switches 26. No action is required by the primary driver in this case. In the event the primary driver intends to inhibit the traction control disable feature for the secondary driver (e.g., prevent the secondary driver from either enabling/disabling the traction control feature), the primary driver may select the inhibit feature via the switches 26 thereby precluding the secondary driver from enabling/disabling the traction control feature. The device 22 may transmit the signal ESC_CONTROL to the ESC module 54 (e.g., if the ESC control switch 56 is coupled to the device 22) which is indicative of whether the secondary driver can enable/disable the one or more ESC operations or whether the secondary driver is precluded from enabling/disabling the traction feature.

A parking aid module 58 may be operably coupled to the device 22. The parking aid module 58 is adapted to provide a warning to the driver in the event the front or rear portions of the vehicle comes too close to an object while the vehicle is being parked. In one example, a park aid switch 59 may be coupled to the parking aid module 58 and enable/disable the park aid feature. In another example, the driver may use the switches 26 to enable/disable the park aid feature. In another implementation the parking aid module 58 may be integrated into an auto park module 60. The auto park module 60 may be coupled to device 22. The auto park module 60 is generally configured to automatically park the vehicle for the driver. For example, in a parallel parking situation, the driver may give control over the vehicle to the auto park module 60 and allow the vehicle to park itself. An auto park switch 62 is coupled to the auto park module 60 for controlling the operation of the auto park switch 62.

The operation of the park aid feature may be enabled/disabled based on the status of the driver. The primary driver is free to enable/disable the operation of the park aid feature as desired. The primary driver may prevent the secondary driver from disabling the park aid feature. The parking aid module 58 is adapted to receive the signal DRIVER_STATUS_1 from the device 22 to determine if the driver of the vehicle is the primary or the secondary driver. In the event the driver of the vehicle is determined to be the primary driver, the device 22 may allow the primary driver to enable/disable the park aid operation via the park aid switch 59. In one example, the primary driver may view the enable/disable park aid option via the display 24 and select the enable/disable option via the switches 26. In such an example, the device 22 may transmit a control signal (not shown) to the parking aid module 58 to enable/disable the park aid feature.

In the event the driver is the secondary driver, the device 22 inhibits the park aid disable option and prevents the secondary driver from viewing the enable/disable park aid option in the display 24. In the auto park module 60 implementation, the device 22 may be adapted to transmit the signal DRIVER_STATUS_1 to the auto park module 60 to determine whether the driver is the primary or the secondary driver.

A powertrain control module (PCM) 68 is operably coupled to the device 22. The PCM is generally configured to transmit a signal VEH_SPEED which corresponds to the speed of the vehicle. The PCM 68 may directly compute the vehicle speed for the vehicle or may receive the vehicle speed from an anti-locking brake module (or other braking module) (not shown). Likewise, the device 22 may optionally receive the signal VEH_SPEED directly from the braking module.

The system 20 is configured to enable the operation of various expanded configurable settings. Such expanded configuration settings generally allows the primary driver to select discrete vehicle speeds so that various vehicle alerts can be triggered therefrom. For example, the primary driver may select a speed so that an alert (such as a chime or other suitable notification mechanism) is triggered in response to the vehicle achieving the speed selected by the primary driver. For example, the primary driver may enter into the device 22 via the switches 26 or voice command 27, a first selected speed for the secondary driver so as to generate an alert in the event the vehicle exceeds such a speed when the vehicle is driven by the secondary driver. The primary driver may enter into the device 22 via the switches 26 or voice command 27 a second selected speed for the secondary driver so that the ACM 48 is muted in the event the vehicle, while being driven by the secondary driver, reaches the second selected speed. The second selected speed is presumed to be greater than the first selected speed. Further, the ACM 48 may decrease the volume as the vehicle is driven between the first selected speed and the second selected speed and ultimately mute the audio once the second selected speed is achieved while the secondary driver is driving the vehicle.

It is contemplated that the ACM 48 may mute the audio in response to the vehicle achieving the first preselected speed (e.g., the second preselected speed may not be necessary). The primary driver can enable/disable the expanded configuration settings for the secondary driver. In operation, the device 22 may transmit the first and/or second selected speeds on a signal SPD_SELECT to the ACM 48 and the speed in which the vehicle is traveling on the signal VEH_SPEED to the ACM 48 so that the ACM 48 limits the volume of and/or mutes the audio signals. The system 20 prevents the secondary driver from turning the expanded configurable settings off (e.g., disabling the expanded configuration settings) and is to adhere to the selected speed settings and corresponding volume/mute selections made by the primary driver.

An auxiliary protocol interface module (APIM) 70 is operably coupled to the device 22. The APIM 70 is configured to receive an occupant communication device (OCD) 74. The APIM 70 is generally part of an in-vehicle communication system which interfaces with the OCD 74 to enable voice input control to perform a function with the OCD 74 so that the driver does not have to enter data directly into the OCD 74. The APIM 70 may interface via switches (not shown) positioned within the vehicle to enable touch selection control to perform a function with the OCD 74 so that the driver does not have to enter data directly into the OCD 74. The OCD 74 is coupled to the vehicle via port(s) (not shown) on the APIM 70. In one example, the APIM 70 may be implemented as part of the SYNC system developed by Ford Motor Company® and Microsoft® which is known in the art. The OCD 74 may include any number of communication devices that use a wireless protocol. For example, one such wireless protocol may include Bluetooth™. The OCD 74 may use any protocol that is generally situated to facilitate wireless communication. The OCD 74 may be a phone, a text messaging device, a music generating device (such as a phone that plays MP3 songs) whereby all of such items use the Bluetooth™ protocol to communicate. In yet another example, the OCD 74 may include other devices such as Universal Serial Bus (USB) based music playback devices (e.g., Zune™ and iPod® by Apple®). In yet another example, the OCD 74 may include a link that is hardwired coupled into a line-in input provided on the APIM 70. Such a link may receive an input from music playback device to transmit audio via speakers in the vehicle.

In general, the APIM 70 may receive any mobile communication device or digital media player and allow the vehicle occupant to operate such devices via voice input and/or touch input. The switches may be positioned on the APIM 70, the vehicle's steering wheel, the ACM 48 or on the device 22 used to facilitate touch input. In the event the OCD 74 comprises a wireless protocol based text messaging device that is coupled to the APIM 70, the vehicle occupant may be presented with a listing of preselected text messages from the APIM 70 for the occupant to select via touch input and/or voice input to transmit the selected text to another user.

As noted above, the APIM 70 enables the driver to perform functions with the OCD 74 by receiving voice input commands or touch selection via the switch so that the driver does not have to enter various selections directly with the OCD 74. It is generally preferable that drivers avoid performing functions with the OCD by entering data or selection switches/buttons directly on the OCD 74. It is known that a driver may be distracted while driving when inputting data or selecting a button on the OCD 74. Such distractions may be avoided if the driver controls the OCD 74 via the voice command capability or the switch selection features offered by the APIM 70 and/or the switches. The system 20 is configured to encourage the secondary driver to use voice control or touch selection via the switches on the vehicle to operate the OCD 74. The APIM 70 may recognize any number of voice inputs to control the OCDs 74 to perform a particular function (e.g., place phone call, dial a particular number, adjust volume, turn on/off OCD 74, or any other foreseeable operation generally performed by the particular OCD 74). In addition, an occupant may enter data (e.g., the actual phone number or actual text) as a voice input followed by a command to dial the number via voice input. One or more of the operations noted directly above may also be performed by the driver via the switches.

The APIM 70 is not configured to force either the primary driver or the secondary driver to control the OCD 74 via voice command or touch input (via the switches on the vehicle). However, the APIM 70 provides a means for enabling the primary driver or the secondary driver to control the OCD 74 so that the driver is not required to perform selections via the switches/buttons positioned on the OCD 74. It is necessary for the driver to electronically couple (or pair) his/her OCD 74 to the APIM 70 to enable the primary or secondary driver to control the OCD 74 via the voice control or switch selection on the vehicle. It is recognized that the primary driver or secondary driver is not required to pair his/her OCD 74 to the APIM 70. For example, while the APIM 70 is capable of detecting the presence of an OCD 74 in the vehicle, particularly in the case in which the OCD 74 is a text messaging device (or cell phone) and prompting the occupant to pair or mate such an OCD 74 to the APIM 70, the APIM 70 is not configured to force the occupant to use the OCD 74 via the APIM 70 in the vehicle. As a mechanism to encourage the secondary driver to pair his/her OCD 74 to the APIM 70, the APIM 70 may control the ACM 48 to mute audio signals and/or stop transmitting video signals. The APIM 70 may transmit a signal PAIR_STATUS to the device 22 which indicates whether an OCD 74 that is detected by the APIM 70 in the vehicle has been paired to the APIM 70. The device 22 transmits the signal PAIR_STATUS to the ACM 48. The ACM 48 determines whether the OCD 74 has been paired to the APIM 70 based on the signal PAIR_STATUS and determines the driver status based on the signal DRIVER_STATUS. In the event the ACM 48 determines that the OCD 74 has not been paired to the APIM 70 and the secondary driver is detected, then the ACM 48 mutes the audio signals and/or deactivates the transmission of video signals.

The system 20 encourages the secondary driver to pair his/her OCD 74 to the APIM 70 by muting the audio and/or disabling video playback. The secondary driver uses the voice control and/or touch control via the switches in the vehicle so that the secondary driver minimizes the number of instances in which he/she selects the switches/buttons on the OCD 74 or does not utilize the buttons on the OCD 74 at all. The ACM 48 may remove the muted condition in response to determining that the secondary driver has paired the OCD 74 to the vehicle or determining that the driver of the vehicle is the primary driver. The muting of audio and/or disabling of video signals may be enabled/disabled as desired by the primary driver for himself/herself. The primary driver may set the muting of audio and/or disabling of the video for the secondary driver. In such a case, the secondary driver cannot turn off the audio mute feature or the video disable feature if set by the primary driver.

The primary driver enables the audio mute feature and/or the video disable feature via menu selections (e.g., via audio input, touch selection of switches 26, or touch screen selection). In response to such selections, the device 22 transmits a signal ADMIN_OPTION to the APIM 70. The APIM 70 determines whether to transmit the signal PAIR_STATUS based on the message content of the signal ADMIN_OPTION. If the signal ADMIN_OPTION indicates that the primary driver has enabled the audio mute and/or video disable feature, the APIM 70 transmits the signal PAIR_STATUS which indicates whether the secondary driver has paired his/her OCD 74 to the vehicle. It is generally contemplated that the primary driver may set the audio mute and/or video disable features for himself/herself in the event the primary driver fails to pair the OCD 74 to the APIM 70. In the event the primary driver does not want the audio mute and/or video disable features on, the primary driver may disable via the device 22.

In yet another implementation, the ACM 48 may mute the audio and/or cease to transmit video signal in response to detecting that the vehicle is driving too close to another vehicle and detecting that the driver is the secondary driver. For example, the FCW module 50 may include one or more radars positioned therein or positioned exterior to the FCW module 50. The radar(s) and the FCW module 50 co-act with each other to determine the proximity of the vehicle with respect to another vehicle. The FCW module 50 may send control signals to the device 22 so that the device 22 triggers alerts/chimes and to the ACM 70 so that the ACM 70 mutes the audio and/or disables the transmission of video signals in response to determining that the vehicle is in a tailgate mode (i.e., tailgating) with respect to another vehicle and the vehicle of the driver is detected to be the secondary driver. Such a feature may be enabled and disabled via the device 22 as desired by the primary driver. However, the feature may not be disabled by the secondary driver in the event the primary driver has enabled such feature for the secondary driver.

Figure 2:
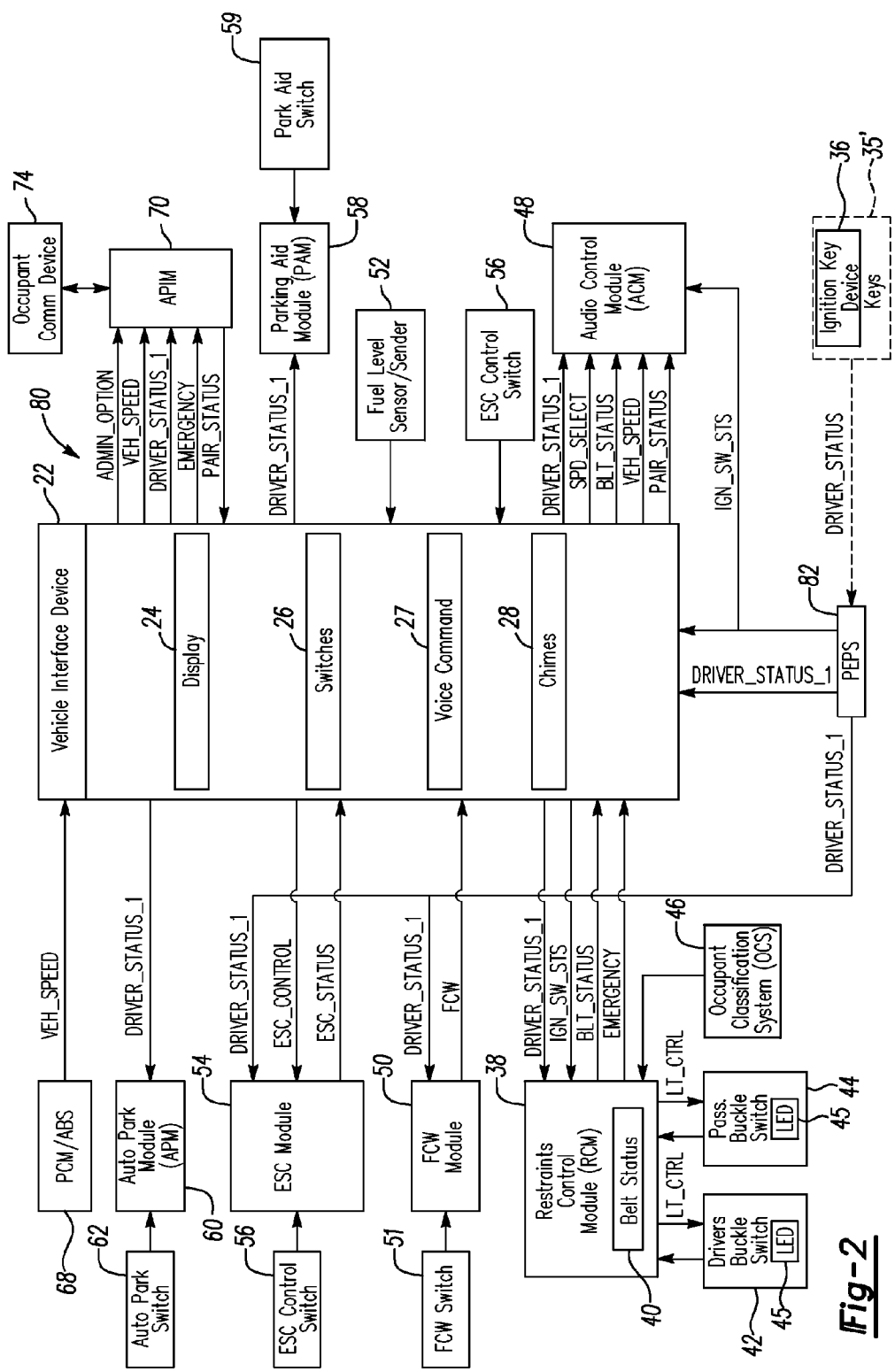
FIG. 2 depicts another system for differentiating between primary and secondary drivers of a vehicle and for controlling the operation of various vehicle features based on the status of the driver in accordance to another embodiment of the present invention.

FIG. 2 depicts a system 80 for differentiating between primary and secondary drivers and for controlling the operation of various vehicle features based on the status of the driver in accordance to another embodiment of the present invention. A passive entry passive start (PEPS) controller 82 may be operably coupled to the device 22. The PEPS controller 82 may be used in place of the PATS controller 30 as illustrated in FIG. 1. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle. In response to the door handle being toggled or touched, the PEPS controller 82 may wake up and transmit RF based signals to the keys. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 80 may be adapted to tag or associate the keys as either a primary or a secondary key during a learn operation as discussed with the PATS controller 30. In yet another example, the system 80 may be configured to associate the keys as primary or secondary keys in the manner identified and disclosed in U.S. patent Ser. No. 12/139,005, entitled "SYSTEM AND METHOD FOR PROGRAMMING KEYS TO ESTABLISH PRIMARY AND SECONDARY DRIVERS" and filed on Jun. 13, 2004, as noted above. The PEPS controller 82 may determine the driver status based on the information indicated on the signal DRIVER_STATUS as noted in connection with the system 20 of FIG. 1.

Any number of additional keys may be tagged as either the primary or secondary key. For example, a plurality of replacement or spare keys may be learned to the vehicle and designated as either a primary or a secondary key. The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted on the cell phone may be received by a receiver (a receiver) on the vehicle and decoded to perform driver authentication for gaining entry into the vehicle, starting the vehicle, and ascertaining driver status.

The device 22 inhibits FCW disable, the park aid disable, ESC disable, and provides for the early low fuel warning in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle. In addition, the system 80 is configured to mute audio and/or stop transmitting video signals in response to determining that the driver is a secondary driver and one or more of the following vehicle events are detected: vehicle occupant not buckled, OCD 74 not paired to APIM 70, speed of vehicle is equal to at least one of a first selected speed and a second selected speed as set by the primary driver. The primary driver may enable/disable muting the audio and/or stopping the transmission of the video signals for the secondary driver based on the occurrence of one or more of the above vehicle events. The device 22 prevents the secondary driver from turning off the audio mute feature or the video disable feature.

Figure 3:
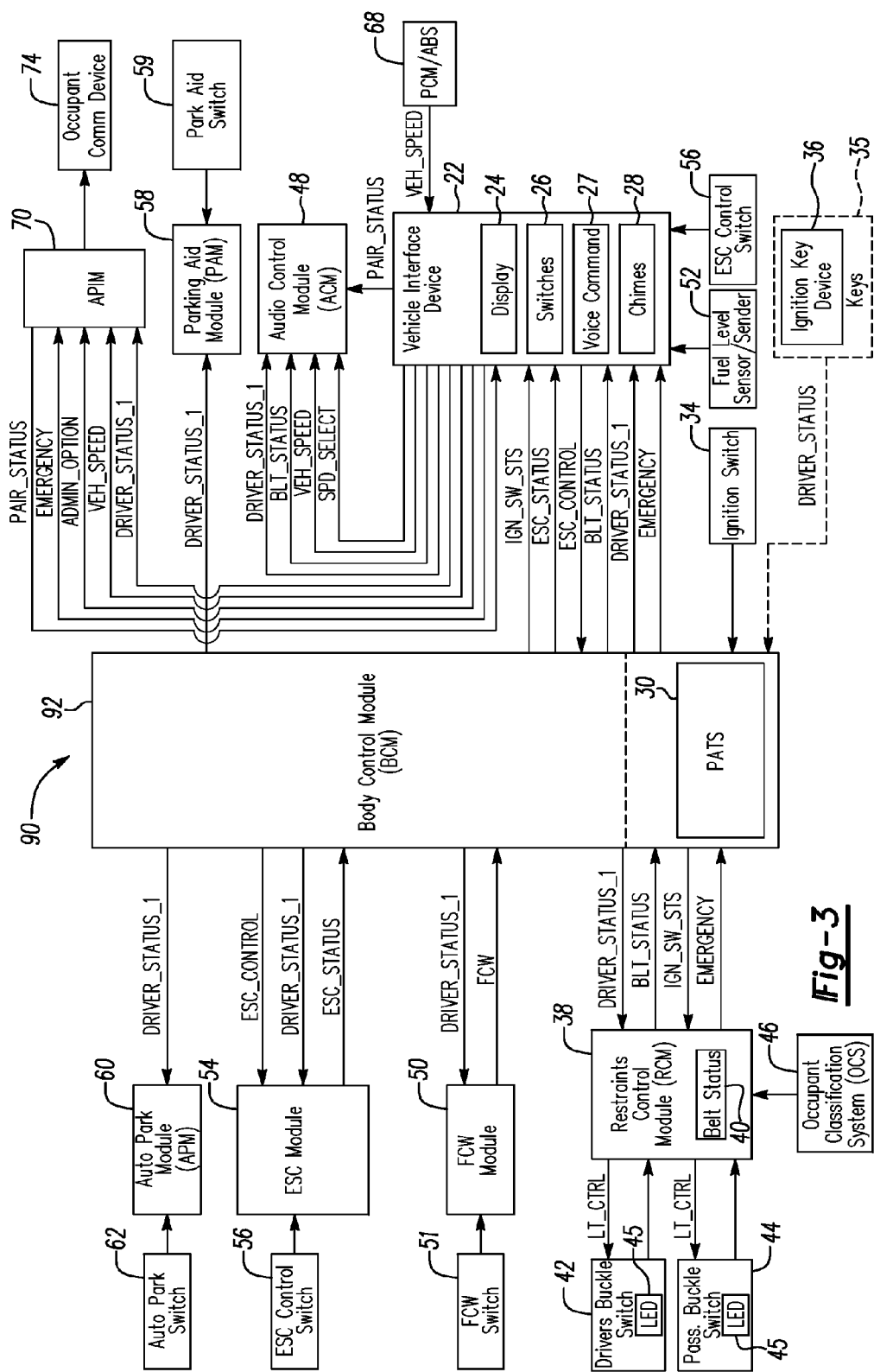
FIG. 3 depicts another system for differentiating between primary and secondary drivers of a vehicle and for controlling the operation of various vehicle features based on the status of the driver in accordance to another embodiment of the present invention.

FIG. 3 depicts another system 90 for differentiating between primary and secondary drivers of a vehicle and for controlling the operation of various vehicle features based on the status of the driver in accordance to another embodiment of the present invention. A body control module (BCM) 92 may be operably coupled to the device 22. The BCM 92 may be adapted to perform a number of interior body electrically based functions. For example, the BCM 92 may perform interior locking, remote keyless entry (RKE), interior/exterior lighting, wiper control (front and/or rear) and other suitable functionality that is generally attributed to the interior electronics of the vehicle.

The PATS controller 30 may be positioned within the BCM 92. While FIG. 3 generally illustrates that the PATS controller 30 is positioned within the BCM 92, the PATS controller 30 may be positioned in the device 22 or any other controller or module shown in FIG. 3. In addition, the PATS controller 30 may be implemented as a standalone unit. The particular placement of the PATS controller 30 may be varied to meet the design criteria of a particular implementation. The PATS controller 30 may be coupled directly to the ignition switch 34. The BCM 92 may transmit the signal IGN_SW_STS to the device 22 via the data communication bus. The BCM 92 may transmit and receive all signals as illustrated in FIG. 3 via the data communication bus. Additionally, the device 22 may transmit and receive all signals as illustrated in FIG. 3 via the data communication bus. The BCM 92 may be adapted to transmit the signal DRIVER_STATUS_1 to the device 22, the restraint control module 38, the seatbelt status controller 40, the audio control module 48, the ESC module 54, the parking aid module 58, the auto park module 60, and/or the APIM 70.

The device 22 inhibits FCW disable, the park aid disable, ESC disable, and provides for the early low fuel warning in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle. In addition, the system 90 is configured to mute audio and/or stop transmitting video signals in response to determining that the driver is a secondary driver and one or more of the following vehicle events are detected: vehicle occupant not buckled, OCD 74 not paired to APIM 70, speed of vehicle is equal to at least one of a first selected speed and a second selected speed as set by the primary driver. The primary driver may enable/disable muting the audio and/or stopping the transmission of the video signals for the secondary driver based on the occurrence of one or more of the above vehicle events. The device 22 prevents the secondary driver from turning off the audio mute feature or the video disable feature.

Figure 4:
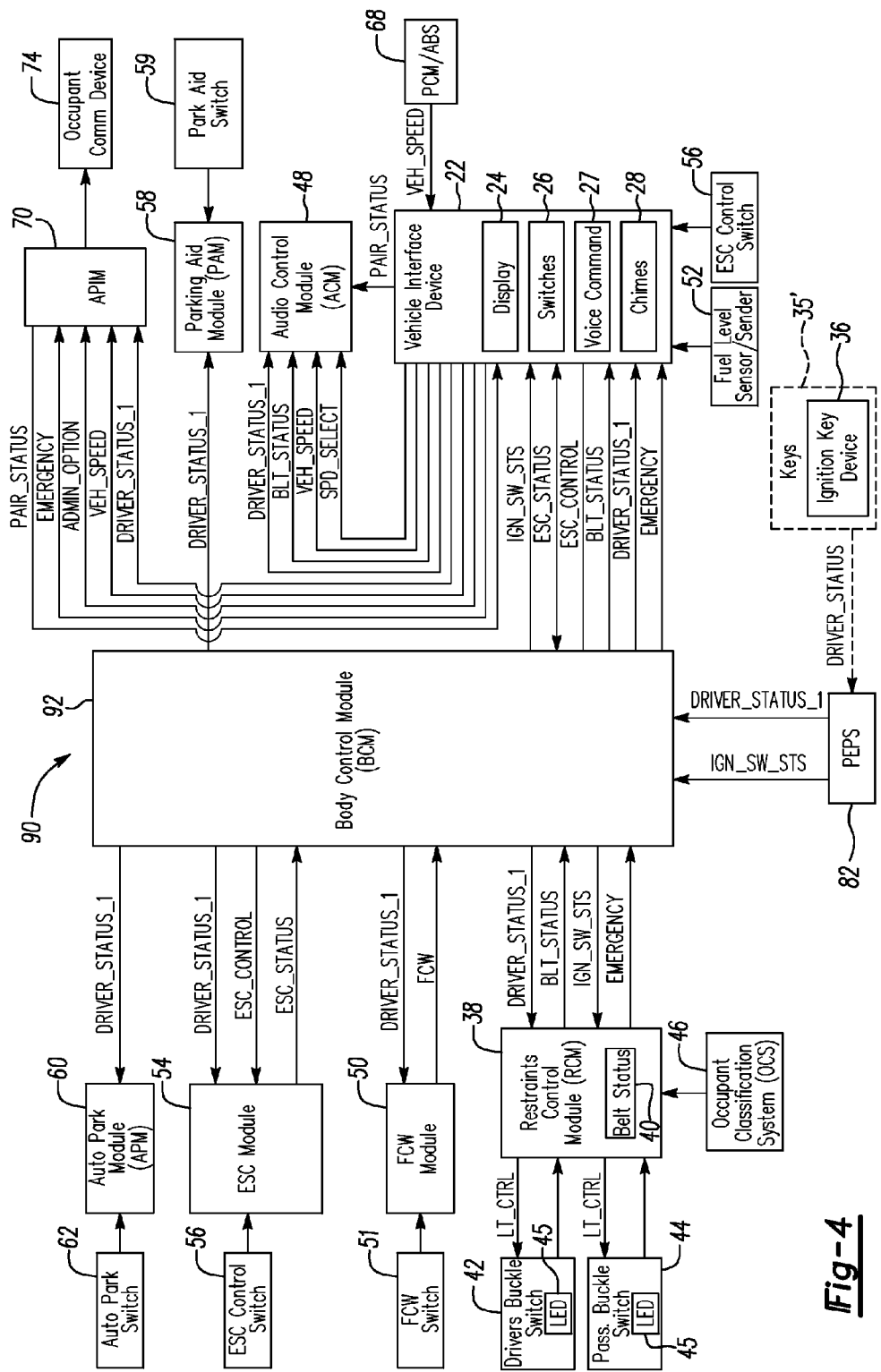
FIG. 4 depicts another system for differentiating between primary and secondary drivers of a vehicle and for controlling the operation of various vehicle features based on the status of the driver in accordance to another embodiment of the present invention.

FIG. 4 depicts another system 100 for differentiating between primary and secondary drivers of a vehicle and for controlling the operation of various vehicle features based on the status of the driver in accordance to another embodiment of the present invention. The PEPS controller 82 may be operably coupled to the BCM 92. The PEPS controller 82 may transmit the signals IGN_SW_STS and DRIVER_STATUS to the BCM 92. While FIG. 4 generally illustrates that the PEPS controller 82 is positioned external to the BCM 92, the PEPS controller 82 may be integrated into the BCM 92 or any other controller (or module) shown. The particular placement of the PEPS controller 82 may vary to meet the desired criteria of a particular implementation. As noted in FIG. 3, the BCM 92 may be adapted to transmit the signal DRIVER_STATUS_1 to the device 22, the restraint control module 38, the seatbelt status controller 40, the audio control module 48, the ESC module 54, the parking aid module 58, the auto park module 60 and/or the APIM 70.

The device 22 inhibits FCW disable, the park aid disable, ESC disable, and provides for the early low fuel warning in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle. In addition, the system 100 is configured to mute audio and/or stop transmitting video signals in response to determining that the driver is a secondary driver and one or more of the following operations occur: vehicle occupant not buckled, OCD 74 not paired to APIM 70, speed of vehicle is equal to at least one of a first selected speed and a second selected speed as set by the primary driver. The primary driver may enable/disable muting the audio and/or stopping the transmission of the video signals for the secondary driver based on the occurrence of one or more of the above vehicle events. The device 22 prevents the secondary driver from turning off the audio mute feature and/or the video disable feature.

While FIGS. 3-4 generally illustrate that the device 22 transmits the signal DRIVER_STATUS_1 to the APIM 70, it is generally contemplated that the BCM 92 may transmit one or more of the signals directly to the APIM 70 instead of the device 22.

Figure 5:
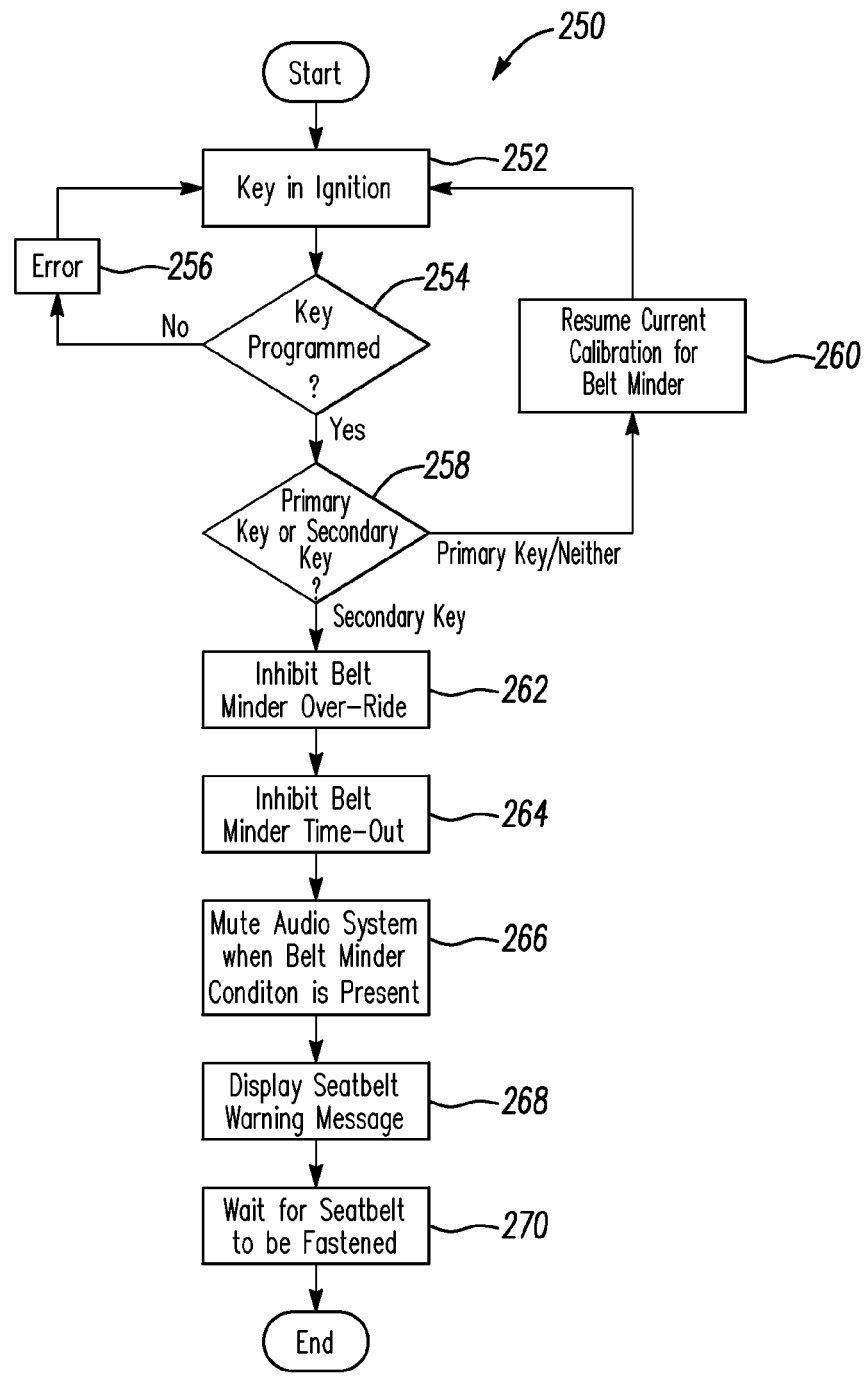
FIG. 5 depicts a method for inhibiting a seatbelt restraint status based on the status of the driver.

FIG. 5 depicts a method 250 for inhibiting the seatbelt status notification operation based on the status of the driver. One or more of the controller and module described in connection with the method 250, but not limited to any number of microprocessors, ASICs, ICs, memory devices (e.g., FLASH, RAM, ROM, EPROM, and/or EEPROM) and software which co-act with one another to perform the various operations of the method 250.

In block 252, the driver inserts the key into the ignition. For systems 20 and 90, the key ignition switch 34 transmits the signal IGN_SW_STS to the device 22 or the BCM (see FIGS. 1 and 3). The device 22 or the BCM 92 transmits the signal IGN_SW_STS over the bus. For systems 80 and 100, the PEPS controller 82 transmits the signal IGN_SW_STS over the bus to the various controller or module (see FIGS. 2 and 4).

In block 254, the keys are monitored to determine if the keys were programmed to start the vehicle. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or the secondary driver. In the event the keys are not programmed or valid to start the vehicle, the diagram 250 moves to block 256. In the event the keys are properly programmed, the diagram 250 moves to block 258.

In block 256, an error is detected. The PATS controller 30 or the PEPS controller 82 determines an error and may not allow the driver to start the vehicle in the event the keys are not properly programmed to start the vehicle.

In block 258, the RCM 38 determines if the key was programmed as a primary key for the primary driver or if the key was programmed as a secondary key for the secondary driver. If the key is determined to be a primary key, then the diagram 250 moves to the block 260. If the key is determined to be a secondary key, then the diagram 250 moves to the block 262. If the key is not associated with a primary driver or a secondary driver, then the diagram 250 moves back to block 260.

In block 260, the primary driver may resume the current belt status configuration. The primary driver has the option of disabling and enabling the seatbelt status as desired for himself/herself. The seatbelt status controller 40, if left on (or enabled) by the primary driver, may optionally disable the ACM 48 in the event the seatbelt warning is issued both visually and audibly if the primary driver is not buckled and/or the rest of the applicable vehicle criteria is met. The seatbelt status controller 40 may continue to visually and audibly warn the primary driver and optionally disable the ACM 48 for a predetermined amount of time and then turn off in the event the primary driver does not fasten the seatbelts. In addition, if the key was not programmed as either a primary key or a secondary key, the current belt status is maintained and the driver of the vehicle may have the option of disabling and enabling the seatbelt status as desired.

In block 262, the seatbelt status controller 40 inhibits the seatbelt status override feature for the secondary driver. In other words, the seatbelt status controller 40 may not allow the secondary driver to disable the seatbelt status notification feature.

In block 264, the seatbelt status controller 40 inhibits the seatbelt status time feature for the secondary driver. For example, the seatbelt status controller 40 prevents the secondary driver from adjusting the time interval as to when the driver is notified of an unbuckled seat belt. After the first notification is provided to the secondary driver, the seatbelt status controller 40 and/or the device 22 continues to provide the notification feature at the end of each time interval until all of the affected seatbelt(s) are buckled.

In block 266, the ACM 48 is disabled (e.g., audio is muted and/or video is not transmitted) when the driver is visually notified that one or more of the seatbelts are not buckled. It is generally contemplated that the audio may be muted and/or video is not transmitted even if the visual or audio notification times out and one or more of the seatbelts remain unbuckled. For systems 20 and 80; the seatbelt status controller 40 transmits the signal BLT_STATUS to the ACM 48 via the device 22 (see FIGS. 1-2). For system 90 and 100, the seatbelt status controller 40 transmits the signal BLT_STATUS to the ACM 48 via the device 22 and the BCM 92 (see FIGS. 3-4). In general, the seatbelt status controller 40 transmits the signal BLT_STATUS to the ACM 48 to turn off audio and/or video (except for cell phone conversation and during a voice recognition session) generated from the ACM 48 (e.g., music, news, weather, etc.) to notify the secondary driver of the seatbelt unbuckled status. The ACM 48 may remain in a disabled state until the seatbelt of the secondary driver is buckled. In addition, the seatbelt status controller 40 monitors the particular positioning of occupants seated throughout the vehicle via the occupant classification system 46. In the event the driver is the secondary driver and one or more of the seats, which include an occupant unbuckles his/her seatbelt, the ACM 48 is disabled and the secondary driver is audibly and visually warned via the device 22 that any one or more of the seatbelts of the occupants are unbuckled. The warning may remain on until the secondary driver and/or the vehicle occupants buckle their respective seatbelts. The seatbelt warning is generally issued when the seatbelts are detected to be unfastened and/or when a predetermined vehicle speed is achieved (e.g., 6 kph). The particular value used for the predetermined vehicle speed may be varied to meet the desired criteria of a particular implementation. It is generally contemplated that the ACM 48 may limit the volume (or audio) as opposed to completely muting the audio and/or disabling video transmission.

In block 268 the device 22 displays and/or audibly presents the seatbelt warning message which corresponds to one or more seatbelts not being in a buckled state. The seatbelt warning message may be displayed via a telltale in the device 22, the display 24 and/or in a visual indicator on the ACM 48.

In block 270 the seatbelt status controller 40 monitors the driver's and passenger's buckle switch 42, 44 to detect seatbelt buckle status or waits for the seatbelt to be fastened.

Figure 6:
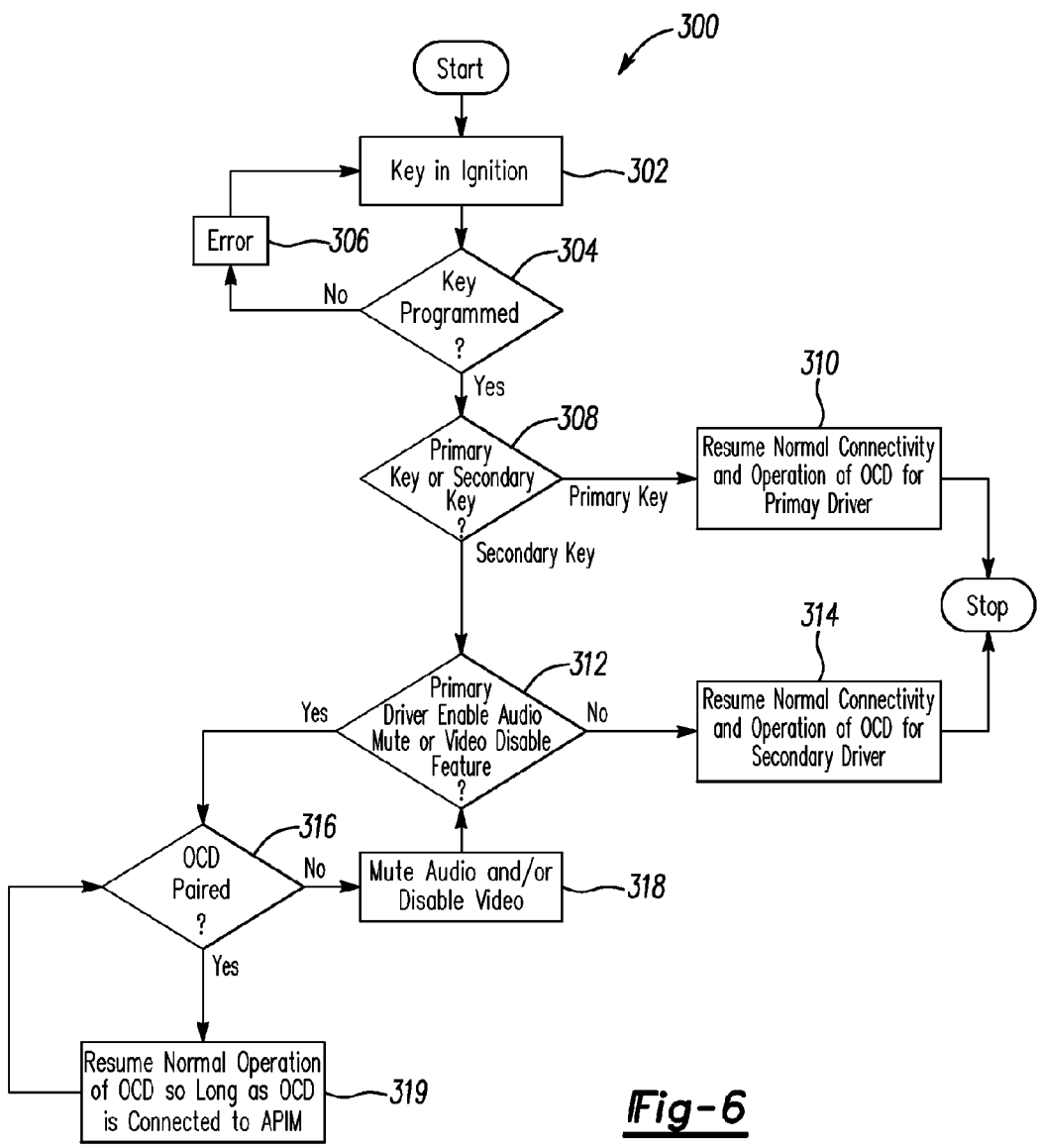
FIG. 6 depicts a method for controlling and entering data into an occupant communication device based on driver status.

FIG. 6 depicts a method 300 for controlling and entering data into the OCD 74 based on driver status in accordance to one embodiment of the present invention. One or more controllers and modules described in connection with the method 300 may include, but not limited to, any of microprocessors, ASICs, ICs, memory devices (e.g., FLASH, RAM, ROM, EPROM and/or EEPROM) and software which co-act with one another to perform the various operations of the method 300.

In block 302, the driver inserts the key into the ignition. For systems 20 and 90, the key ignition switch 34 transmits the signal IGN_SW_STS to the SPDJB 32 or the BCM (see FIGS. 1 and 3). The device 22 or the BCM 92 transmits the signal IGN_SW_STS over the bus. For systems 80 and 100, the PEPS controller 82 transmits the signal IGN_SW_STS over the data communication bus to the various controllers or modules (see FIGS. 2 and 4).

In block 304, the keys are monitored to determine if the keys were programmed to start the vehicle. The PATS controller 30 or the PEPS controller 82 is adapted to determine if the keys are valid for starting the vehicle. In the event the keys are not programmed or valid to start the vehicle, the method 300 moves to block 306. In the event keys are properly programmed, the method 300 moves to block 308.

In block 306, an error is detected. The PATS controller 30 or the PEPS controller 82 determines an error and may not allow the driver to start the vehicle in the event the keys are not properly programmed to the vehicle.

In block 308, the device 22 determines if the key is a primary key for the primary driver or if the key is a secondary key for the secondary driver. If the key is determined to be a primary key, then the method 300 moves to block 310. If the key is determined to be the secondary key, then the method 300 moves to block 312. If the key is not associated with a primary or a secondary driver, then the method 300 moves to the block 310.

In block 310, the driver may resume normal operation of the OCDs 74. In the normal operation mode, the primary driver may command a phone, text messaging device, iPod® or any other device by directly touching one or more switches/buttons on any one of the aforementioned devices to perform a particular task (e.g., place a call, turn device on/off, send text message, adjust volume, skip tracks, etc.). In addition, the primary driver may command and/or enter data into such devices via voice input or switch selecting (i.e., switch positioned on the vehicle). The primary driver may also command the aforementioned devices to perform a particular task or enter text and/or numerals via voice input.

In block 312, the APIM 70 determines whether the primary driver has enabled the audio mute and video disable feature based on the signal ADMIN_OPTION. If the APIM 70 determines that the data on the signal ADMIN_OPTION indicates that the primary driver has not enabled the audio mute and video disable feature, then the method 300 moves to block 314. If the APIM 70 determines that that data on the signal ADMIN_OPTION indicates that the primary driver has enabled the audio mute and video disable feature, then the method 300 moves to block 316.

In block 314, the secondary driver may resume normal operation of the OCDs 74. In the normal operation mode, the secondary driver may command a phone, text messaging device, iPod® or any other device by directly touching one or more switches/buttons on any one of the aforementioned devices to perform a particular task (e.g., place a call, turn device on/off, send text message, adjust volume, skip tracks, etc.). In addition, the secondary driver may command and/or enter data into such devices via voice input (i.e., via the APIM 70) or switch selection (i.e., via switches positioned in the vehicle). The secondary driver may also command the aforementioned devices to perform a particular task or enter text and/or numerals via voice input.

In block 316, the APIM 70 determines whether the OCD 74 belonging to the secondary driver has been paired therewith (e.g., electrically coupled to the APIM 70) when the OCD 74 is detected to be in the vehicle. The APIM 70 determines whether the OCD 74 is in the vehicle by monitoring the presence of a communication protocol used by the OCD 74 to enable communication. The APIM 70 transmits the signal PAIR_STATUS to indicate whether the OCD 74 belonging to the secondary driver has been paired (or electrically connected to the APIM 70). If the APIM 70 determines that the OCD 74 has not been paired, then the method 300 moves to block 318. If the APIM 70 determines that the OCD 74 has been paired, then the method 300 moves to block 319.

In block 318, the ACM 48 mutes audio and/or ceases to transmit video signals in response to receiving the signal PAIR_STATUS which indicates that the secondary driver has not paired his/her OCD 74 to the APIM 70. It is generally contemplated that that the ACM 48 may limit the volume as opposed to completely muting the audio. The determination whether to limit volume of the audio or completely mute the audio may vary based on the desired criteria of a particular implementation. The ACM 48 remains disabled until the OCD 74 is paired to the APIM 70. In another example, the ACM 48 may periodically mute (or periodically limit the volume) the audio signals and/or periodically stop transmitting the video signals at predetermined intervals as opposed to completely muting the audio signals or completely stopping the transmission of the video signals until the OCD 74 is paired to the APIM 70.

In block 319, the APIM 70 enables normal operation of the OCD 74 via voice control or switch control with the vehicle so long as the OCD 74 is not disconnected from the APIM 70. For example, the secondary driver may disconnect the OCD 74 from the APIM 70 and manually enter data into the buttons of the OCD 74 even after the secondary driver has successfully paired the OCD 74 to the APIM 70. In the event the secondary driver disconnects (e.g., removes the paired condition) the OCD 74 from the APIM 70, the ACM 48 may mute the audio and/or cease to transmit the video signal therefrom.

Figure 7:
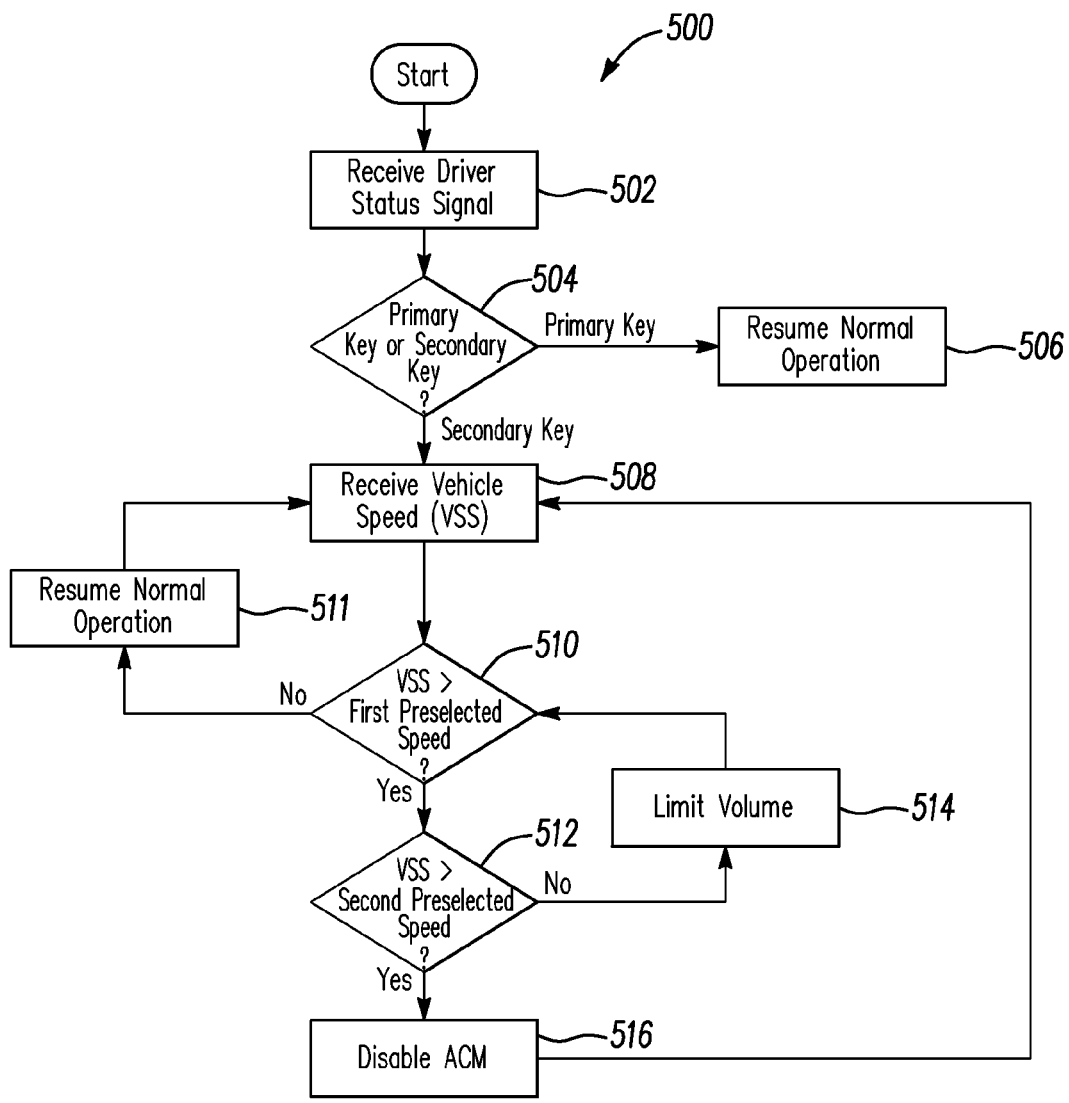
FIG. 7 depicts a method for generating a speed-based audio mute based on driver status.

FIG. 7 depicts a method for generating a speed-based audio mute based on driver status. One or more of the controllers and modules described in connection with the method 500 may include, but not limited to, any number of microprocessors, ASICs, ICs, memory devices (e.g., FLASH, RAM, ROM, EPROM, and/or EEPROM) and software which co-act with one another to perform the various operations of the method 500.

In block 502, the ACM 48 receives the signal DRIVER_STATUS_1 over the bus.

In block 504, the ACM 48 determines whether the driver of the vehicle is the primary driver or the secondary driver based on the signal DRIVER_STATUS_1. If the driver is detected to be the primary driver, then the method 500 moves to block 504. If the driver is detected to be the secondary driver, then the method 500 moves to 508.

In block 506, the ACM 48 resumes normal operation.

In block 508, the ACM 48 receives the signal VEH_SPEED to ascertain the speed of the vehicle.

In block 510, the ACM 48 determines whether the speed of the vehicle is greater than the first preselected speed as set by the primary driver. If the vehicle speed is not greater than or equal to the first preselected speed, then the method 500 moves to block 511. If the vehicle speed is greater than or equal to the first preselected speed, the method 500 moves to block 512.

In block 511, the ACM 48 resumes normal operation.

In block 512, the ACM 48 determines whether the speed of the vehicle is greater than the second preselected speed as set by the primary driver. If the vehicle speed is not greater than or equal to the first preselected speed, then the method 500 moves to block 514. If the vehicle speed is greater than or equal to the second preselected speed, then the method 500 moves to block 516.

In block 514, the ACM 48 limits the volume of the audio signals transmitted therefrom to notify the secondary driver that the vehicle has exceeded the first preselected speed set by the primary driver.

In block 516, the ACM 48 is disabled (e.g., the ACM 48 mutes the audio and/or stops transmitting the video) to notify the secondary driver that the vehicle has exceeded the first and the second preselected speeds set by the primary driver. It is contemplated that the ACM 48 may mute the audio and/or stop transmitting video after the vehicle speed is detected to exceed only the first preselected speed and that a preliminary warning of limiting the volume is not implemented. The particular implementation of muting audio/video signals based on the first and/or the second preselected speeds may vary based on the desired criteria of a particular implementation.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling an entertainment device based on driver status of a driver in a vehicle, the method comprising:
    receiving a key identification signal indicative of the driver being one of a primary driver and a secondary driver from a key ignition device;
    receiving a vehicle status signal to determine an occurrence of a predetermined vehicle event; wherein receiving the vehicle status signal comprises:
    receiving a pair status signal, at the entertainment device, to determine if at least one occupant communication device belonging to the secondary driver has been electrically mated to a communication module positioned within the vehicle; and
    disabling an operation of the entertainment device in response to the key identification signal indicating that the driver is the secondary driver and determining the occurrence of the predetermined vehicle event, wherein disabling the operation of the entertainment device comprises:
    disabling the operation of the entertainment device in response to determining that the pair status signal indicates that the at least one occupant communication device belonging to the secondary driver has not been electrically mated to the communication module.

2. The method of claim 1 wherein disabling the operation of the entertainment device further comprises muting the transmission of an audio signal from the entertainment device.

3. The method of claim 2 wherein disabling the operation of the entertainment device further comprises preventing the transmission of a video signal from the entertainment device.

4. The method of claim 1 wherein receiving the vehicle status signal to determine the occurrence of the predetermined vehicle event further comprises receiving a vehicle speed signal to determine if the vehicle speed signal exceeds at least one pre-selected speed value that is established by the primary driver.

5. The method of claim 4 wherein disabling the operation of the entertainment device further comprises disabling the operation of the entertainment device in response to determining that the vehicle speed signal exceeds the at least one pre-selected speed value as established by the primary driver.

6. The method of claim 1 wherein receiving the vehicle status signal to determine the occurrence of the predetermined vehicle event further comprises receiving at least one seat belt buckle status signal to determine if at least one of the secondary driver and one or more passengers in the vehicle are in an unbuckled state.

7. The method of claim 6 wherein disabling the operation of the entertainment device further comprises disabling the operation of the entertainment device in response to determining that the seat belt buckle status signal indicates that the at least one of the secondary driver and the one or more passengers in the vehicle are in the unbuckled state.

8. The method of claim 1 further comprising selectively controlling the operation of the entertainment device for the secondary driver in the event the key identification signal indicates that the driver is the primary driver so that the entertainment device is capable of at least one of muting audio signals and preventing the transmission of video signals.

9. An apparatus for transmitting at least one of an audio signal and a video signal based on driver status and an occurrence of a predetermined vehicle event; the apparatus comprising:
    an entertainment device configured to:
        receive a key identification signal indicative of the driver being one of a primary driver and a secondary driver;
        receive a vehicle status signal to detect the occurrence of the predetermined vehicle event, wherein the vehicle status signal comprises a pair status signal indicative of whether at least one occupant communication device belonging to the secondary driver has been successfully paired to a communication module;
        disable a transmission of the at least one of the audio signal and the video signal in response to the key identification signal indicating that the driver is the secondary driver and to detecting the occurrence of the predetermined vehicle event; and
        disable the transmission of the at least one of the audio signal and the video signal in response to detecting that the pair status signal indicates that the at least one occupant communication device belonging to the secondary driver has not been successfully paired to the communication module.

10. The apparatus of claim 9 wherein the vehicle status signal comprises at least one of a vehicle speed signal indicative of the speed of the vehicle and a seat belt buckle status signal indicative of whether at least one of the secondary driver and one or more passengers in the vehicle are buckled.

11. The apparatus of claim 10 wherein the entertainment device disables the transmission of the at least one of the audio signal and the video signal in response to detecting that the vehicle speed signal exceeds at least one pre-selected speed value as established by the primary driver.

12. The apparatus of claim 10 wherein the entertainment device disables the transmission of the at least one of the audio signal and the video signal in response to detecting that the seat belt buckle status signal indicates that the at least one of the secondary driver and the one or more passengers in the vehicle are in an unbuckled state.

13. A method for controlling the operation of an entertainment device that transmits at least one of an audio signal and a video signal based on driver status and on an occurrence of a predetermined vehicle event, the method comprising:
    receiving a key identification signal from a key indicative of the driver being one of a primary driver and a secondary driver;
    receiving a vehicle status signal, at the entertainment device, indicative of at least a pair status signal corresponding to whether at least one occupant communication device belonging to the secondary driver has been successfully paired to a communication module;
    detecting the occurrence of the predetermined vehicle event based on the vehicle status signal;
    disabling a transmission of the at least one of the audio signal and the video signal from the entertainment device in response to the key identification signal indicating that the driver is the secondary driver and to detecting the occurrence of the predetermined vehicle event, and
    disabling the transmission of the at least one of the audio signal and the video signal from the entertainment device in response to determining that the pair status signal indicates that the at least one occupant communication device belonging to the secondary driver has not been successfully paired to the communication module.

14. The method of claim 13 wherein the vehicle status signal comprises at least one of a vehicle speed signal indicative of the speed of the vehicle and a seat belt buckle status signal indicative of whether at least one of the secondary driver and one or more passengers in the vehicle are buckled.

15. The method of claim 14 wherein disabling the transmission of the at least one of the audio signal and the video signal from the entertainment device further comprises disabling the transmission of the at least one of the audio signal and the video signal from the entertainment device in response to determining that the vehicle speed signal exceeds at least one pre-selected speed value as established by the primary driver.

16. The method of claim 14 wherein disabling the transmission of the at least one of the audio signal and the video signal from the entertainment device further comprises disabling the transmission of the at least one of the audio signal and the video signal from the entertainment device in response to determining that the seat belt buckle status signal indicates that the at least one of the secondary driver and the one or more passengers in the vehicle are in an unbuckled state.

\* \* \* \* \*